United States Patent [19]

Endo et al.

[11] Patent Number: 4,567,897

[45] Date of Patent: Feb. 4, 1986

[54] ULTRASONIC DIAGNOSTIC APPARATUS

[75] Inventors: Noriaki Endo, Tochigi; Tsuyoshi Yoshie, Ootawara, both of Japan

[73] Assignee: Kabushiki Kaisha Toshiba, Japan

[21] Appl. No.: 641,270

[22] Filed: Aug. 16, 1984

[30] Foreign Application Priority Data

Aug. 19, 1983 [JP] Japan .................. 58-150187

[51] Int. Cl.⁴ .................................. A61B 10/00
[52] U.S. Cl. ......................... 128/660; 358/112
[58] Field of Search ............. 128/660; 73/625–626; 358/112

[56] References Cited

U.S. PATENT DOCUMENTS

| 4,058,001 | 11/1977 | Waxman | 128/660 |
| 4,236,221 | 11/1980 | Cribbs et al. | 128/660 X |
| 4,310,907 | 1/1982 | Tachito et al. | 128/660 X |
| 4,372,323 | 2/1983 | Takemura et al. | 128/660 |
| 4,398,540 | 8/1983 | Takemura et al. | 128/660 |
| 4,423,737 | 1/1984 | Yano et al. | 128/661 |
| 4,431,007 | 2/1984 | Amazeen et al. | 128/660 |

Primary Examiner—Kyle L. Howell
Assistant Examiner—Francis J. Jaworski
Attorney, Agent, or Firm—Finnegan, Henderson, Farabow, Garrett & Dunner

[57] ABSTRACT

In a digital scan converter, a vector data generator is provided. When the scanning mode is selected, the predetermined vector data adapted to the selected scanning mode is generated from the vector data generator. This vector data is temporarily stored and then used when the actual scanning commences.

7 Claims, 9 Drawing Figures

F I G. 2A
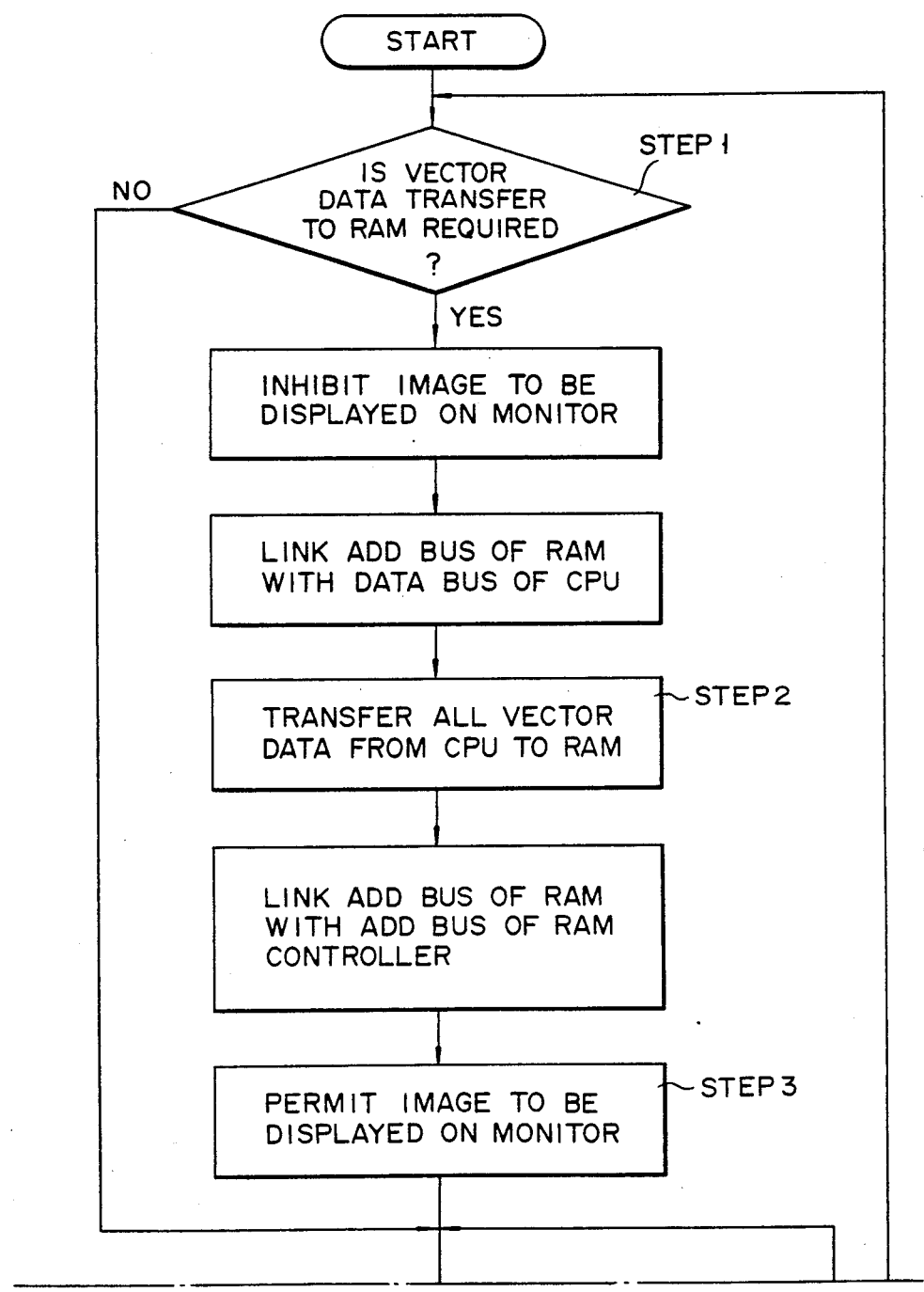

F I G. 4A
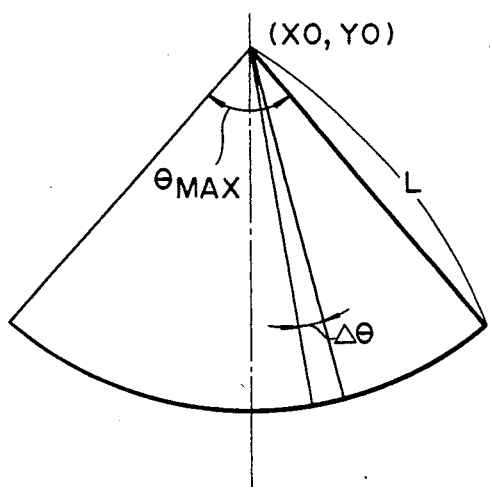
F I G. 4B
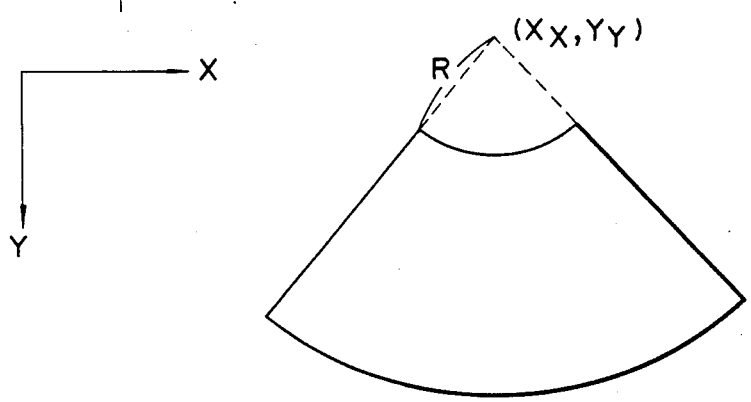
F I G. 4C
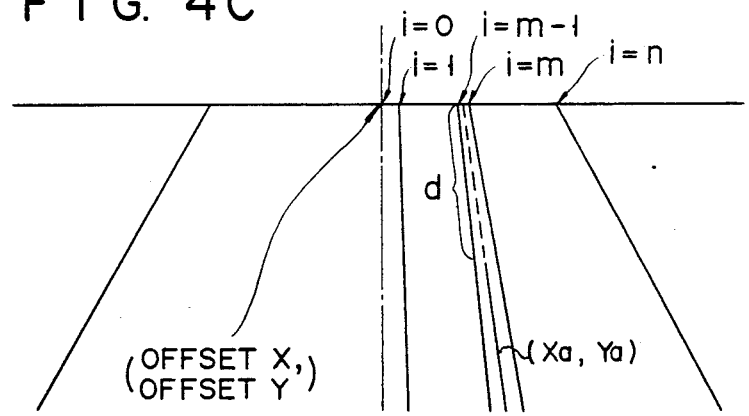

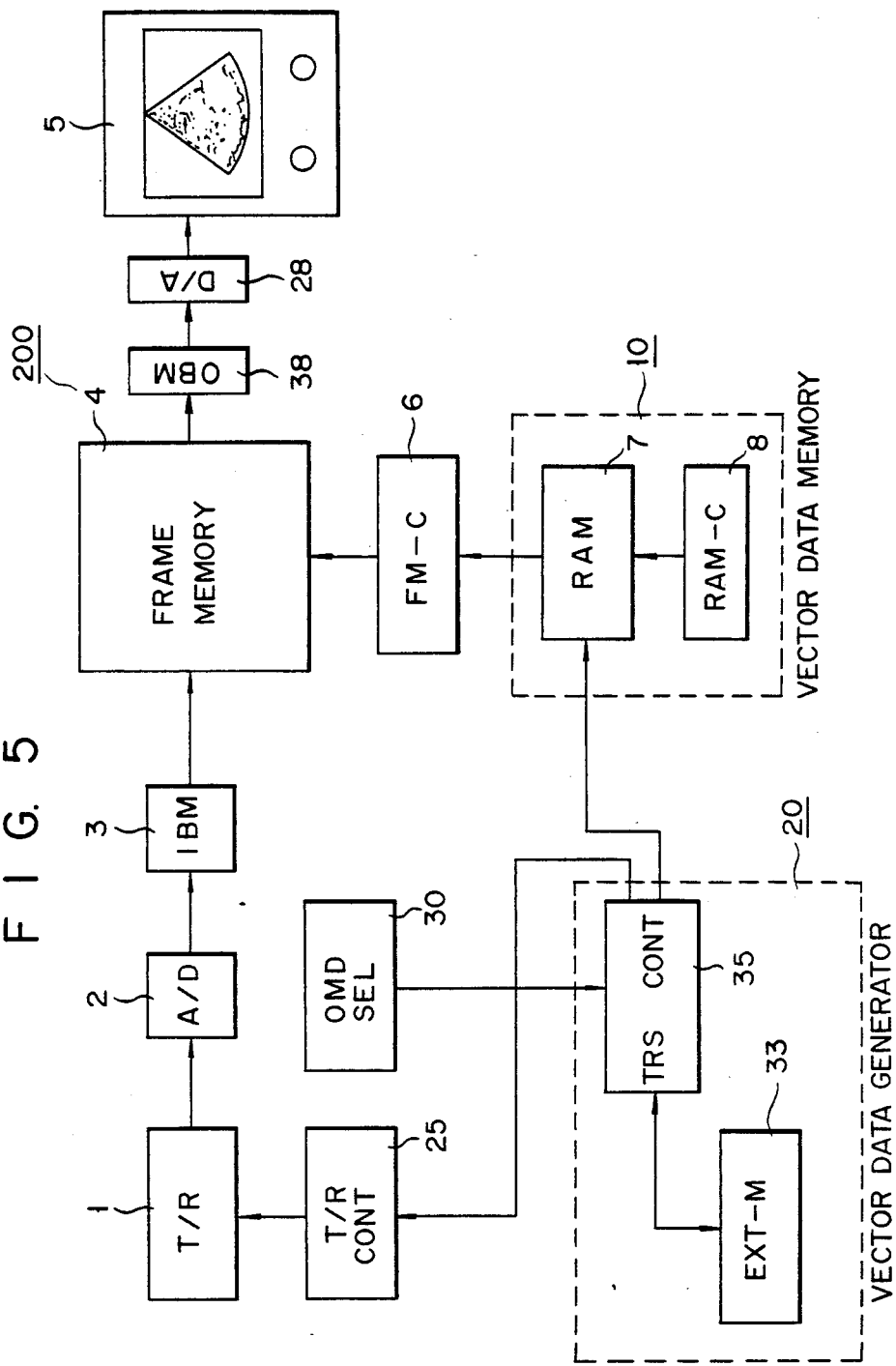

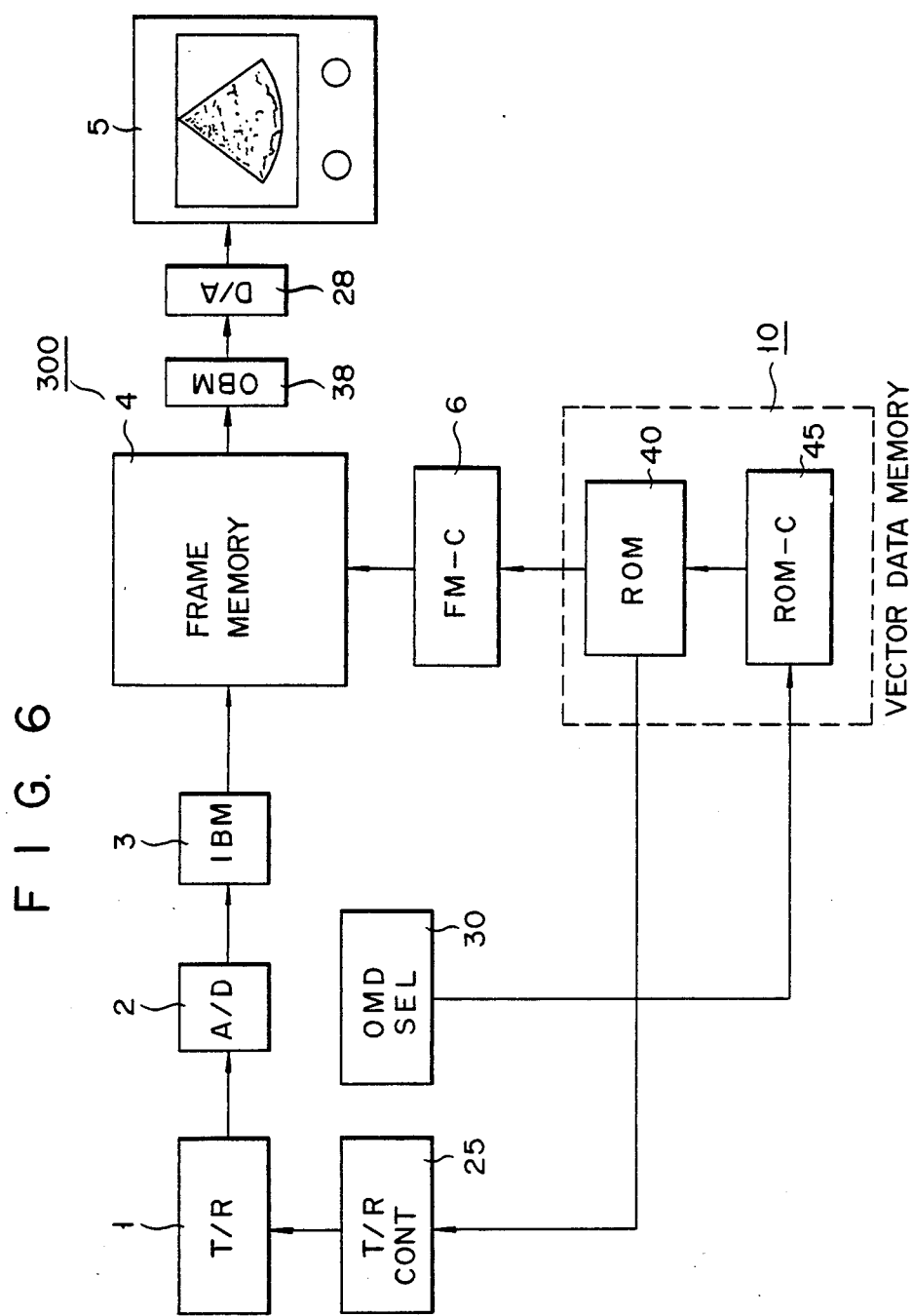

4,567,897

ULTRASONIC DIAGNOSTIC APPARATUS

BACKGROUND OF THE INVENTION

1. Field of the Invention

This invention relates to an ultrasonic diagnostic apparatus in a type of digital scan converter.

2. Description of the Prior Art

Among conventional ultrasonic diagnostic apparatuses for transmitting ultrasonic beams to scan an object under investigation at a scanning rate of about 250 μsec and for forming a tomographic image or tomogram of the object in accordance with reflected ultrasonic echoes from the object, an apparatus of the type called "digital scan converter" has recently been developed. Such an apparatus is described, for example, in U.S. Pat. No. 4,423,737 issued on Jan. 3, 1984 to Yano.

Various types of conventional ultrasonic scan modes such as linear scan, sector scan and convex scan have been proposed.

In a digital scan converter type apparatus, echo signals received from the transducer are converted to digital echo signals which are then temporarily stored in a memory, such as a frame memory. Thereafter, the digital echo signals are read out from the memory. In this case, an address for accessing a predetermined memory cell in the frame memory is produced in accordance with a control signal called "vector data". The vector data is required to determine a memory location in a memory in accordance with vector information (i.e., in association with a scanned portion of the object which is represented by the received echo signals). When the echo signals are obtained by, for example, the sector scanner, predetermined addresses are generated in accordance with position and angle data (i.e., vector data) at the respective portions inside the object (however, in practice, this vector data corresponds to position and angle data of ultrasonic beams transmitted from the scanner). The received echo signals are stored in the frame memory in response to these addresses. As a result, a distribution of the memory locations storing the echo signals becomes a "sector".

Demand has arisen recently to use the abovementioned ultrasonic diagnostic apparatus together with a blood current measurement/display device. In this case, blood flow measurement at a high flow rate is also required. In order to satisfy this need, the ultrasonic beams must be transmitted/received at a high scanning rate.

However, no conventional single-digital-scan-converter-type ultrasonic diagnostic apparatus has been proposed to provide multifunctional scanning modes. In addition, no conventional ultrasonic diagnostic apparatus which can be used in combination with another diagnostic apparatus, such as a blood flow measurement/display device, has ever been proposed.

It is therefore an object of this invention to provide an ultrasonic diagnostic apparatus which performs such multifunctions as linear scanning, the sector scanning, convex scanning, trapezoidal scanning and so on, and also is adapted to combine with another diagnostic apparatus, such as a blood flow measurement device.

SUMMARY OF THE INVENTION

The object may be accomplished by providing an ultrasonic diagnostic apparatus comprising:
- a transducer including a transducer array for successively transmitting ultrasonic beams to scan an object under investigation, and for receiving echoes reflected from the object to derive echo signals;
- an A/D converter for converting the received echo signals into digital echo signals;
- a first memory having memory cells arranged in a matrix array of columns and rows for storing the digital echo signals;
- a mode selector for selecting operation modes of the transducer to determine a desirable scanning form;
- a vector generator for generating vector data adapted to the scanning form in response to the selected operation mode in advance to an acquisition of the echo signals, the vector data representing a starting point, a direction, and a length of a vector in connection with the columns and rows of the matrix array;
- a second memory for storing the vector data; and
- an address controller for controlling storage operations of the first memory by supplying addresses thereto which are produced based upon the vector data, whereby the digital echo signals are stored in the predetermined memory cells in the desirable scanning form under the control of the addresses after a completion of the storage of the vector data into the second memory.

Further objects may be accomplished by providing an ultrasonic diagnostic apparatus comprising:
- a transducer including a transducer array for successively transmitting ultrasonic beams to scan an object under investigation, and for receiving echoes reflected from the object to derive echo signals;
- an A/D converter for converting the received echo signals into digital echo signals;
- a first memory having memory cells arranged in a matrix array of columns and rows for storing the digital echo signals;
- a mode selector for selecting operation modes of the transducer to determine a desirable scanning form;
- a second memory for previously storing vector data adapted to the scanning form;
- a memory controller for controlling the selection of the desirable vector data in response to the selected operation mode in advance of acquisition of the echo signals; and
- an address controller for controlling storage operations of the first memory by supplying addresses thereto which are produced based upon the vector data, whereby the digital echo signals are stored in the predetermined memory cells in the desirable scanning form under the control of the addresses during the scanning of the ultrasonic beams by the transducer.

Still further aspects of the invention involve implementation of the processes carried out by the above-described apparatus.

BRIEF DESCRIPTION OF THE DRAWINGS

The invention is best understood by reference to the accompanying drawings, in which:

FIGS. 2A and 2B are flow charts of the operation of the apparatus shown in FIG. 1;

FIGS. 4A to 4C are illustrations for explaining various types of the beam scanning; and FIGS. 5 and 6 show block diagrams of an ultrasonic diagnostic apparatus according to the other embodiments.

DETAILED DESCRIPTION OF THE PREFERRED EMBODIMENTS

Figure 1:
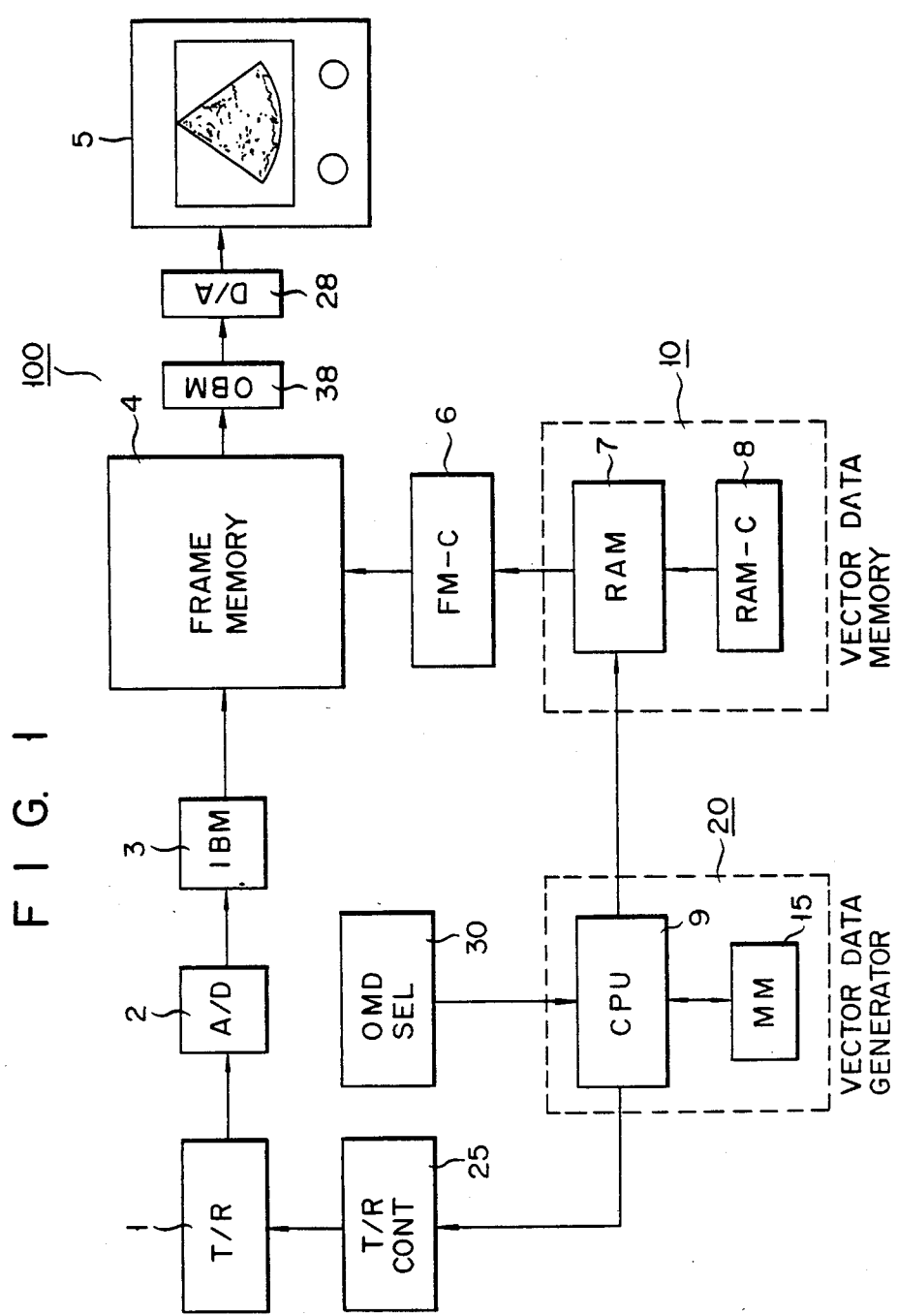
FIG. 1 shows a block diagram of an ultrasonic diagnostic apparatus according to one preferred embodiment.

FIG. 1 is a schematic block diagram showing an ultrasonic diagnostic apparatus 100 according to a first embodiment of the present invention. Reference numeral 1 denotes a transmitter/receiver for transmitting-/receiving ultrasonic beams. Echo data, i.e., an echo signal which is derived from the transmitter/receiver 1 by receiving ultrasonic echoes reflected from an object under investigation (not shown), is supplied to an A/D (analog-to-digital) converter 2. A controller 25 controls mainly a delay time of the transmitter/receiver 1. The A/D converter 2 converts input analog echo signals to digital echo signals. The digital echo signals from the A/D converter 2 are supplied to a frame memory 4 through an input buffer memory 3. The frame memory 4 stores digital data supplied from the input buffer memory 3. The write/read access of the frame memory 4 is controlled by a frame memory address controller 6. Readout contents from the frame memory 4 are temporarily stored in an output buffer memory 38 and then are converted by a D/A converter 28 to analog signals. The analog signals are supplied to a monitor 5 and are displayed thereon. A vector data memory 10 includes a RAM (random access memory) 7 and a RAM controller 8. The RAM 7 stores vector data transferred from a vector data generator 20. The vector data generator 20 includes a main memory 15 for storing a system program and a CPU 9 for reading out the system program and performing predetermined processing so as to generate the vector data. As will be described in detail later, according to the present invention, before the transmitter/receiver 1 transmits/receives the ultrasonic beams to acquire the echo data, a predetermined program is read out from the main memory 15 in accordance with the type of ultrasonic scanner (probe) (not shown) to be used for echo data acquisition and is used for processing by the CPU 9 so as to obtain the vector data. Therefore, before echo data acquisition, the vector data are stored in the RAM 7. It should be noted that program selection is performed by an operation mode selector 30. The vector data stored in the RAM 7 is transferred to the frame memory address controller 6, which then generates a vector address signal. The echo data supplied from the input buffer memory 3 is stored in a predetermined memory cell (not shown in detail) of the frame memory 4 in response to the vector address.

Figure 2B:
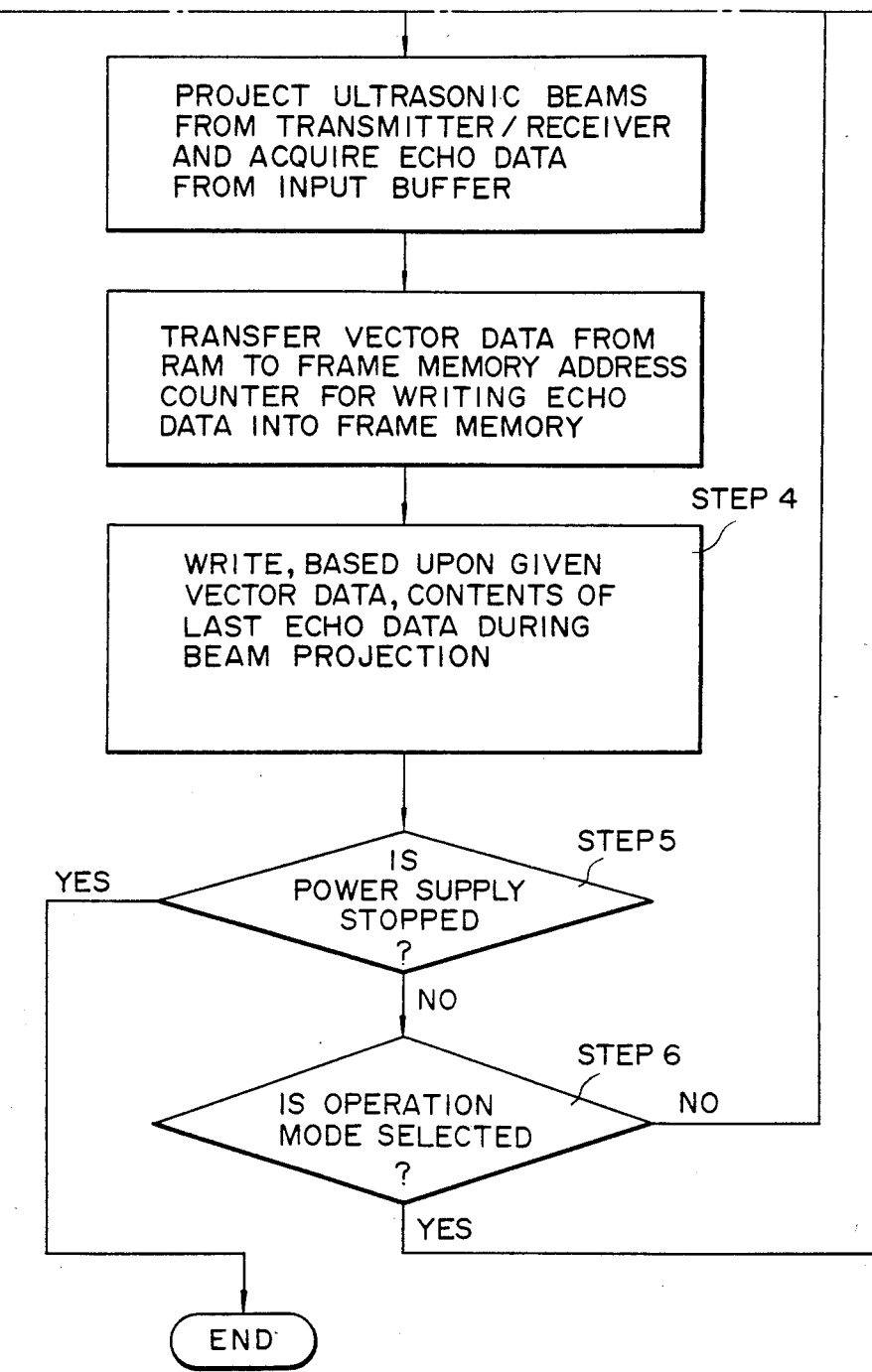

To best understand the operation of the ultrasonic diagnostic apparatus 100 according to the first embodiment with reference to flow charts in FIGS. 2A and 2B, initial information will be first described.

The internal circuit diagram of the RAM controller 8 in the vector data memory 10 will be described with reference to FIG. 3.

Figure 3:
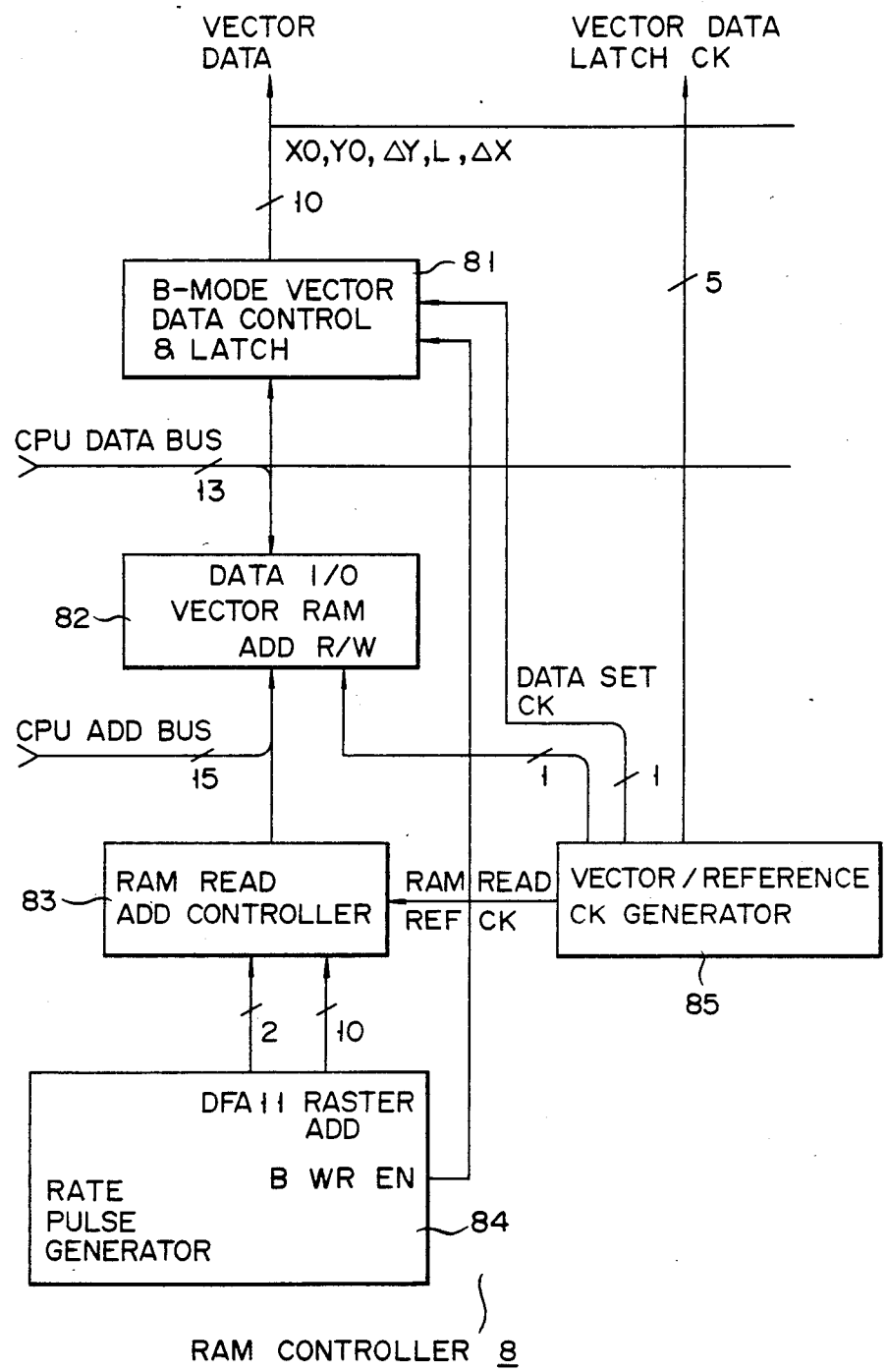
FIG. 3 shows a block diagram of an internal circuit of the RAM controller shown in FIG. 1.

Referring to FIG. 3, the vector data is transferred to a B-mode vector data control & latch 81 and a vector RAM 82 through the data bus of the CPU 9. In this circuit, a B-mode scan is performed. The abovementioned vector data is temporarily stored in the vector RAM 82. The address data is transferred to the vector RAM 82 through the address bus (to be referred to as an ADD BUS hereafter) of the CPU 9 and is temporarily stored therein. The read addressing control of the vector RAM 82 is performed by a RAM read ADD controller 83. This controller 83 is designed to receive rate pulses such as a raster address from a rate pulse generator 84.

A vector/reference clock (to be referred to as a CK for brevity) generator 85 generates a data set clock pulse, a RAM read reference clock pulse, and a read/-write clock pulse. These pulses are supplied to the above-mentioned circuits.

A raster address, i.e., data representing a specific vector among scanning vectors (a "vector" represents the path of a scanning beam), or data indicating that the vector data represents one of a starting point of a vector, Y- or X-direction of the vector, or a vector length "L", is selected by the operation mode selector 30 (FIG. 1) and is generated by the RAM read ADD controller 83. An output from the RAM read ADD controller 83 becomes a read address of the vector RAM 82. The main function of the controller 83 is to read out the data from the vector RAM 82 in accordance with a clock signal from the vector/reference CK generator 85 and the raster address and to cause the respective input data (i.e., echo data) to be latched in a register (not shown in detail) in the frame address controller 6 in response to latch clocks from the generator 85.

The calculation of vector data will be described with reference to FIGS. 4A to 4C.

FIG. 4A shows a vector calculation in a sector scan. Referring to FIG. 4A, a starting point of a vector is represented by components or coordinates XO and YO. The horizontal direction corresponds to the X-direction, and the vertical direction corresponds to the Y-direction. Reference symbols $\Delta X$ and $\Delta Y$ denote X and Y increments defining the slope of a vector, $\theta max$ denotes the angle between the outermost vectors of the sector, $\Delta \theta$ denotes the angle between adjacent vectors or represents the number of an individual vector, $\theta n$ represents the angle of an individual vector and n denotes the number of vectors in the sector. The following equations are established for a sector scan:

$$\Delta \theta = \theta max/(N-1), \quad (1)$$

$$\theta n = -\theta max/2 + n\Delta 0 \ (n=0 \text{ to } N-1), \quad (2)$$

$$\Delta X = \sin(\theta n), \quad (3)$$

$$\Delta Y = \cos(\theta n). \quad (4)$$

A vector in sector scan can be exposed in accordance with the above equations.

FIG. 4B shows a vector calculation in a convex scan. $\Delta \theta$, $\theta n$, $\Delta X$ and Y are defined as in the sector scan. An original starting point in the convex scan is represented by $(X_X, Y_Y)$, and a length from the starting point is represented by "R". An actual vector starting point (XO, YO) is given by the following equations:

$$XO = X_X + R \sin(\theta n), \quad (5)$$

$$YO = Y_Y + R \cos(\theta n). \quad (6)$$

FIG. 4C shows a trapezoidal scan calculation.
(1) Calculations of XO, XB, YO and YB
Change $\Delta \theta$ in Angle Between Vectors:

$$\Delta \theta = \text{constant} = 2\theta/(N-1)$$

Coordinates of the Starting Point of True Vector:

$$X(i) = [(\text{element pitch})/(\text{pixel pitch} \times 2)] \times i + (\text{OFFSET } X)$$

$$Y(i) = \text{OFFSET } Y$$

$$n = (N-1)/2$$

where

N: the number of vectors

OFFSET X: the X address of the frame memory for i=0

OFFSET Y: the Y address of the frame memory for i=0, i: integer from 0 to N (2) Coordinates of the Starting Point of an Interpolated Raster When the raster interval is ½, the X- and Y-coordinates of the resultant interpolated raster starting point are given by:

$$\begin{cases} X_a = \{X(m) + X(m-1)\}/2 + d \times \sin\{(m-\tfrac{1}{2})\Delta\theta\}, \\ Y_a = d \times \cos\{(m-\tfrac{1}{2})\Delta\theta\} + (\text{OFFSET } Y), \end{cases}$$

and where d represents the distance to an interpolated starting point and m is an integer from 0 to N.

When raster intervals are ⅓, 170, ¼ and ¾, X-coordinates of the respective interpolated raster starting points are respectively given as follows:

$$\{X(m) + 2 \times X(m-1)\}/3,$$

$$\{2 \times X(m) + X(m-1)\}/3,$$

$$\{X(m) + 3 \times X(m-1)\}/4,$$

and $$\{3 \times X(m) + X(m-1)\}/4.$$

(3) Calculation of ΔX and ΔY $$\Delta X = 511 \times \sin(i \times \Delta\theta), \text{ and}$$

$$= 2^9 \times \sin(i \times \Delta\theta) - \sin(i \times \Delta\theta).$$

$$\Delta Y = 511 \times \cos(i \times \Delta\theta), \text{ and}$$

$$= 2^9 \times \cos(i \times \Delta\theta) - \cos(i \times \Delta\theta).$$

For ⅓, ⅔, ¼, ½ and ¾ interpolation calculations, i must be replaced with (i−⅓), (i−⅔), (i−¼), (i−½) and (i−¾), respectively.

(4) Calculation of "L"

Data of vector lengths L are stored in a look-up table.

Data of sin (θ) and cos (θ) are stored in the look-up table in units of ⅓ raster intervals. The rasters having ½ intervals are calculated in accordance with relation (⅓ raster + ⅔ raster)/2.

The operation of the apparatus 100 shown in FIG. 1 will be described with reference to the flow charts in FIGS. 2A and 2B.

When the apparatus 100 is first started up, the CPU 9 checks whether or not the vector data needs to be transferred to the RAM 7 (step 1).

If YES in step 1, the CPU 9 performs the operation in accordance with the predetermined program stored in the main memory 15 so as to generate the vector data. The vector data is then transferred to the RAM 7 and causes the monitor 5 to display an image (steps 2 and 3). When the vector data is completely transferred to the RAM 7, the CPU 9 need not perform the operation for generating vector data unless the vector data must be updated (to be described later). The vector data transferred to the RAM 7 and written therein is read out by the RAM controller 8 and is supplied to the frame memory address controller 6. The frame memory address controller 6 generates addresses in accordance with the vector data supplied thereto, thereby controlling the read/write access of the frame memory 4. In other words, the echo data is stored in the input buffer memory 3 upon transmission/reception of the ultrasonic beams. The echo data is written in a specific pixel in the frame memory 4 in response to the addresses generated from the frame memory address controller 6 (step 4).

However, if NO in step 1, i.e., when the CPU 9 detects that the vector data need not be transferred to the RAM 7 (this detection indicates that desired vector data has been already written in the RAM 7), vector data transfer in step 2 is omitted, and the vector data is read out from the RAM 7 and the ultrasonic data is written in the frame memory 4, as shown in step 4.

The CPU 9 then checks in step 5 whether or not the apparatus is deenergized. If YES in step 5, i.e., when the CPU 9 detects that the apparatus is deenergized, the operation of the apparatus is ended. However, if NO in step 5, i.e., when the CPU 9 detects that the apparatus is not deenergized, the CPU 9 checks in step 6 whether or not the mode selection is performed by the operation mode selector 30.

If YES in step 6, i.e., when the CPU 9 detects that the mode selection operation is performed, the flow returns to step 1. The CPU 9 again checks in step 1 whether or not the vector data transfer to the RAM 7 must be performed. In this case, e.g., when the ultrasonic scanning mode is changed from the sector scan mode to the convex scan mode, the CPU 9 determines in step 1 that the vector data must be transferred to the RAM 7.

After the apparatus 100 is energized and also the vector data is written in the RAM 7, the vector data need not be transferred to the RAM 7 unless the present ultrasonic scanning mode is changed, thereby decreasing the occupying time of the CPU 9 and hence improving the overhead throughput of the CPU 9.

If NO in step 6, i.e., when the CPU 9 detects that the operation mode selection is not performed, the flow returns to step 4 and the vector data is read out from the RAM 7, and new ultrasonic data is written in the frame memory 4.

The ultrasonic data written in the frame memory 4 is read out from the frame memory address controller 6 and is displayed on the display monitor 5.

According to this embodiment described in detail above, a plurality of scan modes, such as sector and linear scan modes, are easily achieved by a single ultrasonic diagnostic apparatus. In addition, since the vector data are generated by the CPU 9 and are stored in the RAM 7 before echo data acquisition is performed, the scanning rate can be higher than that of the conventional apparatus. As a result, the ultrasonic diagnostic apparatus of the present invention can be used in combination with any other diagnostic apparatus, such as a blood current measurement/display apparatus.

Furthermore, since the CPU 9 completes operations for generating the vector data before scanning is started, the CPU 9 can perform other calculations during echo data acquisition. Therefore, the CPU operation time for generating the vector data can be shortened.

Second and third embodiments are shown in FIGS. 5 and 6, respectively.

The same reference numerals as in the second and third embodiments denote the same parts and functions as in the first embodiment.

Referring to FIG. 5, a vector data generator 20 includes an external memory 30 and a transfer controller 35 for reading out the storage contents from the external memory 30 and transferring them. The external memory 30 includes a memory such as a floppy disk. The prestored (written) data is read out by the transfer controller 35 such as a CPU from the floppy disk and is transferred to the RAM 7. Any other circuit arrangement of the second embodiment is the same as that of FIG. 1, and a detailed description thereof will be omitted.

The second embodiment having the configuration described above can obtain the same effect as that of the first embodiment. In addition, the second embodiment has an advantage in that a vector data operation algorithm of the CPU need not be used at the time of initialization of the ultrasonic diagnostic apparatus and a scanning operation mode change. In other words, the second embodiment has an advantage in that the CPU (transfer controller 35) need not calculate the vector data.

According to the third embodiment shown in FIG. 6, the vector data memory 10 includes a ROM 40 and a ROM controller 45 for controlling a read operation from the ROM 40. In this case, during the fabrication process of the ROM 40 or thereafter, vector data for various types of scanners are prestored in the ROM 40. The ROM 40 serves as the main memory 15 in the vector data generator 20 shown in FIG. 1. The third embodiment having the above configuration can obtain the same effect as the first embodiment. In addition, the third embodiment has an advantage in that the utilization efficiency of another CPU (not shown) built into this apparatus 300 becomes better than that of FIG. 1.

In addition to the above advantages, the present invention also has the following advantages.

If the RAM 7 and the ROM 40 employ high-speed memories, the number of ultrasonic data acquisition cycles per unit time can be increased due to the following reason. In the conventional ultrasonic diagnostic apparatus, the CPU calculates and generates the vector data for storing the ultrasonic data in the frame memory 4 every time one-dimensional ultrasonic data is acquired. However, according to the ultrasonic diagnostic apparatus of the present invention, the generated vector data are prestored in the RAM 7 or the ROM 40 and are read out when the ultrasonic data acquisition is performed. Therefore, an entire operation time can be shortened by the vector data generation time and the vector data transfer time under the control of the CPU. In addition to this advantage, since the RAM 7 and the ROM 40 employs those high-speed memories, the vector data access time can also be shortened. Therefore, the number of ultrasonic data acquisition cycles per unit time can be increased. As a result, when the ultrasonic diagnostic apparatus according to the present invention can be used in combination with a blood current measurement/display apparatus, a higher blood flow can be measured than can be measured by the measurement/display apparatus used in combination with the conventional ultrasonic diagnostic apparatus. The ultrasonic diagnostic apparatus according to the present invention can also provide other medical advantages.

While the present invention has been described using a specific embodiment, it should be understood that further modifications and changes can be made without departing from the scope of the present invention.

What is claimed is:

1. An apparatus for utilizing ultrasonic beams to scan different shape sections of an object, comprising:
   ultrasonic transducer means for transmitting a series of ultrasonic pulses in the form of a sequence of beams directed toward said object, for collectively defining a particular shape section into which said beams pass, and for receiving echoes of said pulses reflected from said section of said object to produce echo signals;
   means for converting said echo signals into a train of digital data;
   first memory means having memory pixels arranged in a matrix array of columns and rows for storing said digital data;
   second memory means;
   means for generating a plurality of different sets of vector data defining the paths of said beams with each set corresponding to the paths of beams in a different shape section;
   means for writing in said second memory means, prior to transmittal of said pulses, the set of said vector data corresponding to the shape section to be scanned;
   writing means, responsive to said vector data, for writing said digital data into respective pixels of said first memory means with the loction of said respective pixels corresponding to the location in said section from which said digital data was obtained; and
   reading means for reading said digital data from said first memory means in a television format to display a tomogram of said section of said object.

2. An apparatus according to claim 1 wherein said shape sections of the object to be scanned include sectors, convex portions, and trapezoidal portions.

3. An apparatus according to claim 1 wherein said vector data generating means includes a central processing unit for calculating said sets of vector data and writing one of said sets of vector data into said second memory means.

4. An apparatus for utilizing ultrasonic beams to scan different shape sections of an object, comprising:
   ultrasonic transducer means for transmitting a series of ultrasonic pulses in the form of a sequence of beams directed toward said object, for collectively defining a particular shape section into which said beams pass, and for receiving echos of said pulses reflected from said section of said object to produce echo signals;
   means for converting said echo signals into a train of digital data;
   first memory means, having memory pixels arranged in a matrix array of columns and rows, for storing said digital data;
   second memory means for storing a plurality of sets of vector data defining the paths of said beams with each set corresponding to the paths of beams in a different shape section;
   means for selecting one set of said vector data in said second memory means which corresponds to the shape section to be scanned prior to transmittal of said pulses;

writing means, responsive to said vector data, for writing said digital data into respective pixels of said first memory means with the location of said respective pixels corresponding to the location in said section from which said digital data was obtained; and reading means for reading said digital data from said first memory means in a television format to display a tomogram of said section of said object.

5. A process for producing different tomograms from different shape sections of an object comprising the steps of:

selecting the shape section desired;

generating vector data which correspond to the shape section selected;

transferring said vector data to a first memory means for storing said vector data;

transmitting a series of ultrasonic pulses in the form of a sequence of beams toward said object and receiving echo data from said object in a manner which defines said desired shape section;

converting said echo data into digital data;

storing said digital data into respective pixels of said second memory means arranged in a matrix array of columns and rows with said pixels being selected in accordance with said vector data to have locations corresponding to the locations in said section from which said digital data was obtained; and reading said stored digital data out of said second memory means and displaying said data on a display monitor in the form of a tomogram.

6. A process of claim 5, wherein said vector data is obtained by operation of a central processing unit.

7. A process of claim 5, wherein said vector data is obtained from a permanent storage memory device.

* * * * *